US006981307B2

(12) United States Patent
Tanaka et al.

(10) Patent No.: US 6,981,307 B2
(45) Date of Patent: Jan. 3, 2006

(54) MANUFACTURING METHOD FOR FILTER MODULE

(75) Inventors: Norihiro Tanaka, Nagaokakyo (JP); Hiroyuki Kubo, Kusatsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 282 days.

(21) Appl. No.: 10/357,081

(22) Filed: Feb. 4, 2003

(65) Prior Publication Data

US 2003/0145450 A1 Aug. 7, 2003

(30) Foreign Application Priority Data

Feb. 4, 2002 (JP) ............................ 2002-027091

(51) Int. Cl.
*H01S 4/00* (2006.01)
*H01P 11/00* (2006.01)

(52) U.S. Cl. ...................... 29/592.1; 29/600; 29/602.1; 333/134; 333/202

(58) Field of Classification Search ............... 29/592.1, 29/593, 600, 601, 602.1; 327/553, 128; 324/76.29, 324/76.31, 76.44, 76.45, 76.46, 601; 333/202, 333/134

See application file for complete search history.

(56) References Cited

U.S. PATENT DOCUMENTS 5,703,545 A * 12/1997 Dullberg et al. ............ 333/202
6,023,205 A * 2/2000 Huang et al. ............... 333/202
6,075,409 A * 6/2000 Khlat ......................... 329/304
6,366,184 B1 * 4/2002 Ohtonen ..................... 333/202
2002/0022948 A1 * 2/2002 Okada et al. ................. 703/13

FOREIGN PATENT DOCUMENTS

JP 60-66527 4/1985
JP 05-083147 4/1993

OTHER PUBLICATIONS

Eguchi et al., Automatic Filter Characteristic Controller, JP409326615, Publication Date of Dec. 16, 2002.*
Nagata, Yoshiko, System For Supporting Adjustment And Method Therefore, JP410171773, Publication Date of Jun. 26, 1998.*
Naruo, Nabuyuki, High Frequency Filter Adjustment Device, JP404236505, Publication Date of Aug. 25, 1992.*
Copy of Japanese Examiniation Report dated Aug. 2, 2005 (and English translation of same).

* cited by examiner

*Primary Examiner*—David P. Bryant
*Assistant Examiner*—Sarang Afzali
(74) *Attorney, Agent, or Firm*—Dickstein, Shapiro, Morin & Oshinsky, LLP.

(57) ABSTRACT

The measurement and adjustment of characteristics of a filter alone are performed using a connector adapter, in which a pin of the filter becomes a central conductor of the adapter. The filter after the adjustment and a device which is not adjusted are assembled, such that the filter and the device are connected by connecting the pin provided in the filter and a transmission line provided in the device. Accordingly, the time for adjustment is shortened and the adjustment for obtaining the desired characteristics of the filter module are made easy.

8 Claims, 4 Drawing Sheets

MANUFACTURING METHOD FOR FILTER MODULE

DETAILED DESCRIPTION OF THE INVENTION

1. Technical Field of the Invention

The present invention relates to a manufacturing method for a filter module containing a filter and a device except the filter.

2. Description of the Related Art

A filter module containing a filter and a low-noise amplifier (LNA) is disclosed in Japanese Unexamined Patent Application Publication No. 5-83147. In the filter module, the filter and the LNA are housed in the same case, and the LNA is directly connected to a coupling line of the output portion of the filter.

In this way, the characteristics of the filter and the LNA can be monitored and adjusted by using the coupling line.

However, in such filter modules having a filter and a device directly connected and housed in the same case, since the filter and the device are required to be adjusted together, there is a problem in that it takes time to adjust them. Furthermore, when the filter and the device are combined, since the characteristics of each of them are not known, it is not easy to adjust them.

SUMMARY OF THE INVENTION

Accordingly, it is an object of the present invention to provide a manufacturing method for a filter module in which the time for adjustment is shortened and the adjustment for obtaining fixed characteristics is made easy.

According to a manufacturing method for a filter module of the present invention, a device, characteristics measurement of which has been made, and a filter, characteristics adjustment of which is to be made, are provided to manufacture a filter module.

The required characteristics of the filter are first determined from the characteristics of the device and target characteristics of the filter module.

Then, the characteristics of the filter alone are measured. From the characteristics and the required characteristics, adjustment locations and adjustment amounts of the filter are determined so as to meet the required characteristics, and then the adjustment is carried out.

After the adjustment is carried out, the filter and the device are combined to form the filter module.

In the manufacturing method for a filter module according to the present invention, the connection between the filter and the device is preferably made by connecting a pin provided in the filter to a transmission line provided in the device, and the characteristics of the filter alone are measured by attachment of a connector adapter in which the pin constitutes a center conductor.

In a preferred manufacturing method for a filter module according to the present invention, the device is a circuit constructed on a substrate, and the filter is provided with a concave portion into which the substrate is fitted.

Furthermore, in the manufacturing method for a filter module according to the present invention, the device is preferably a low-noise amplifier and the filter is connected in a front stage or rear stage of the low-noise amplifier.

DETAILED DESCRIPTION OF THE PREFERRED EMBODIMENTS

Hereinafter, a manufacturing method for a filter module will be described with reference to the accompanying drawings.

Figure 1A:
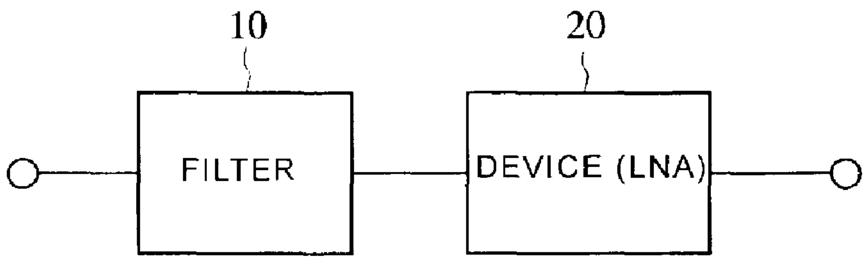
FIGS. 1A and 1B are block diagrams showing a filter module and a filter, respectively.
Figure 1B:
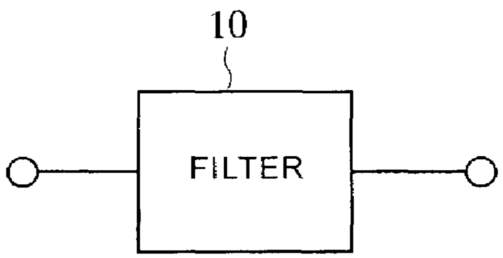

FIG. 1A is a block diagram showing the construction of a filter module at the time when the filter module and its characteristics are adjusted. FIG. 1B shows the construction of a filter 10 separated from a device 20. As is shown in FIG. 1A, the filter module is constructed such that the device 20 (LNA) is provided in a latter stage of the filter 10. In the manufacturing method for a filter module according to the present invention, the device 20, the characteristics of which are known, is used and the measurement and adjustment of the characteristics of the filter 10 alone are performed.

Figure 2A:
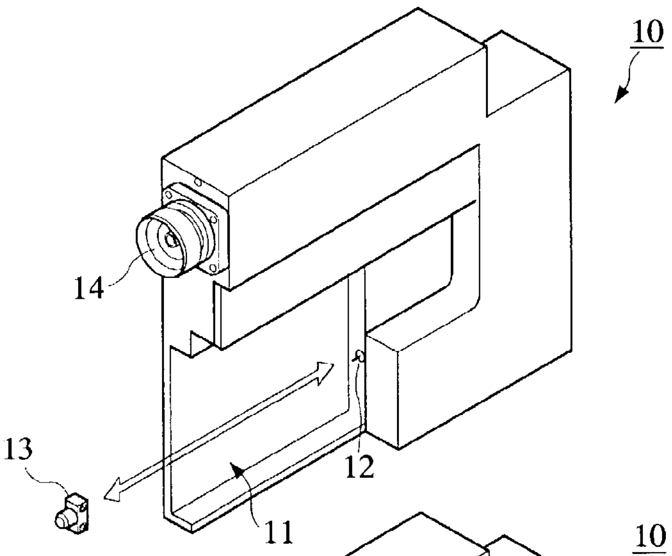
FIGS. 2A–2C are perspective views showing the construction of a filter, device, and filter module.
Figure 2B:
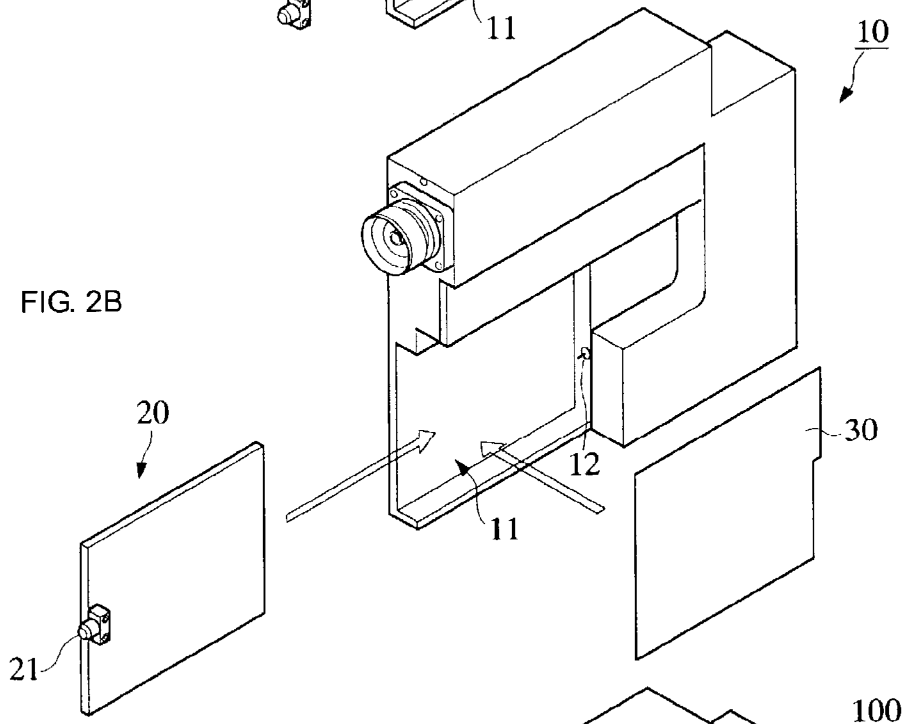
Figure 2C:
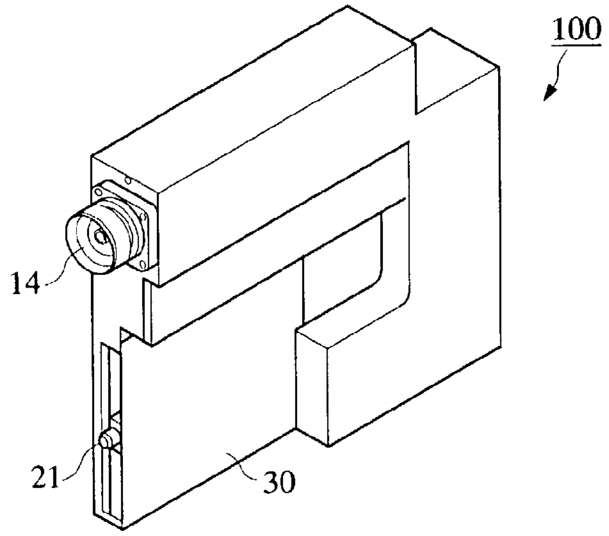

FIGS. 2A through 2C are perspective views showing the construction of the filter, device, and filter module, respectively. FIG. 2A shows the construction of the filter alone. The filter 10 is provided with a connector 14 for connection to the outside. The filter 10 is also provided with a concave portion 11 into which a substrate constituting the device is fitted. A pin 12 for connection to a transmission line of the device is provided in the concave portion 11 of the filter 10. This filter 10 can be used as a dielectric filter in which electrodes are provided inside and outside a dielectric block, or as a dielectric filter in which a dielectric resonator is disposed inside a cavity. Furthermore, the filter 10 is provided with a frequency adjustment screw (not shown) for adjusting a frequency as required.

In FIG. 2A, reference numeral 13 represents a connector adapter. When the connector adapter 13 is attached to the pin 12, a coaxial connector having the connector adapter 13 as an outer conductor and the pin 12 as a central conductor is constructed. In that state, the front end of the filter can be connected to the outside through the connector 14 and the rear end of the filter can be connected to the outside through the coaxial connector made up of the connector adapter 13 and the pin 12.

FIG. 2B shows how the device 20 is fitted into the filter 10. The device 20 shown in FIG. 2B is formed as a circuit board. A connector 21 for connection to the outside is provided in the device 20. The device 20 is electrically connected to the filter 10 by fitting the device 20 into the concave portion of the filter 10 and preferably soldering the pin 12 of the filter 10 to a transmission line of the device 20. Reference numeral 30 represents a protective cover which covers the device 20. Thus, a filter module 100 is constructed as shown in FIG. 2C.

Figure 3A:
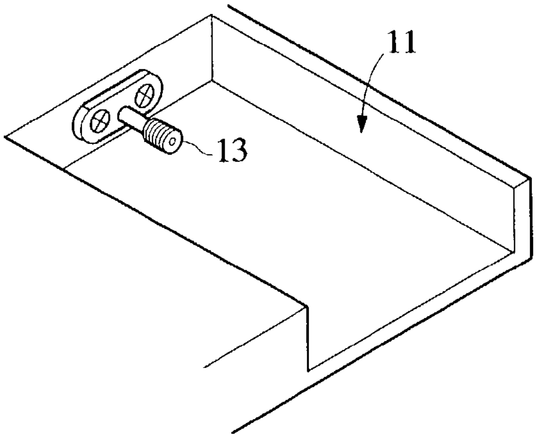
FIGS. 3A–3D are partial perspective views showing the construction of the connection portion between a filter and a device.
Figure 3B:
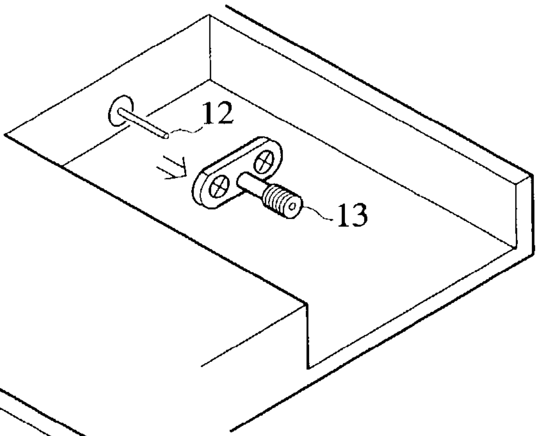
Figure 3C:
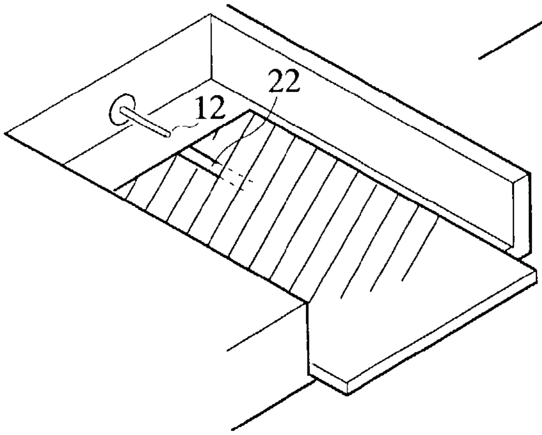
Figure 3D:
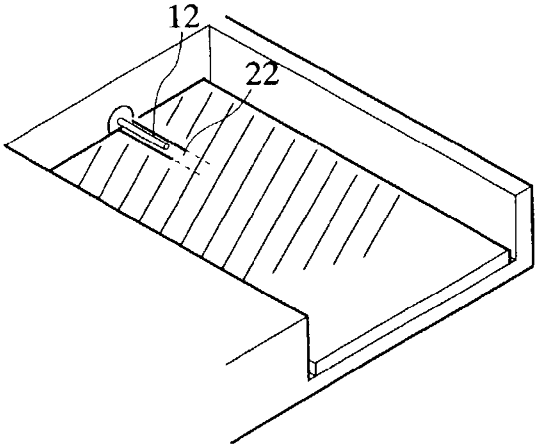

FIGS. 3A through 3D show how the connector adapter 13 is attached to the pin 12 of the above filter, and how the device 20 is connected to the filter. In the filter alone, the connector on the output side of the filter is made such that the connector adapter 13 is attached to the pin 12 as shown in FIG. 3A. After the characteristics of the filter alone has been measured and adjusted, the connector adapter 13 is removed as shown in FIG. 3B, and the filter and the device are electrically connected such that the transmission line 22 is soldered to the pin 12 of the filter as shown in FIGS. 3C and 3D.

Figure 4:
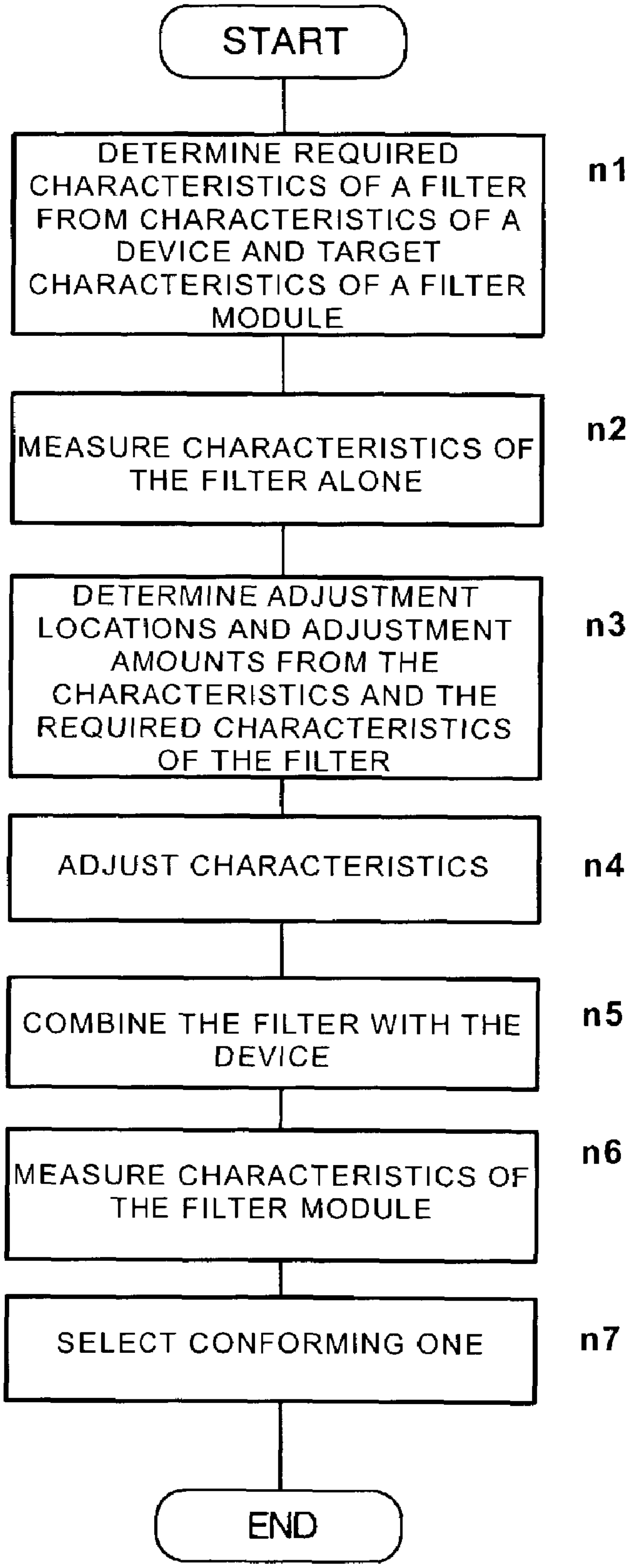
FIG. 4 is a flow chart showing the processes of a manufacturing method for a filter module.

FIG. 4 is a flow chart showing the processes of the manufacturing method for a filter module according to the present invention. In this invention, adjustments are preferably not performed for the variations in manufacture of the device (LNA) to be used in the filter module, but rather, the characteristics of the filter module are set to satisfy a fixed specification by adjustment of only the filter portion.

The required characteristics of the filter are determined from characteristics of the device and target characteristics of a filter module (n1). Preferably, the characteristics of the filter module are normalized using S parameters. The S parameters of the device without the filter are measured using a network analyzer in advance. Then, by using a high-frequency simulator, the S parameters of the filter that satisfy the normalized S parameters of the filter module are determined from the normalized S parameters of the filter module and the S parameters of the device.

Next, the characteristics of the filter alone are measured, and adjustment locations and adjustment amounts of the filter are determined from the measured characteristics of the filter and the required characteristics of the filter (n2 and n3). Preferably, the upper limit and lower limit of each element (equivalent capacitance, inductance, etc.) constituting the filter is set in advance, and the value of each element constituting the filter is determined so as to meet the target S parameters of the filter by using the high-frequency simulator. Moreover, since each element of the filter practically has its own adjustable range different from each other, this is input in advance.

Next, the determined value of each element constituting the filter is input into a computer, the computer is connected to the network analyzer, and the filter is connected to the network analyzer. As commonly conducted in the field of filter designing, calculations are performed to determine what part of the filter is to be cut to what level, the frequency adjustment screw of which resonator is to be turned, etc., and they are adjusted so that the required S parameters may be satisfied (n4).

Then, the filter and the device are assembled to produce a filter module (n5). Thereafter, the characteristics of the filter module are measured, it is judged whether the characteristics are in a specified range or not, and whether the filter module passes and is accepted as a conforming filter module (n6 and n7).

According to the present invention, the device is not adjusted and the measurement and adjustment of the filter alone is made possible. Accordingly, the time required for adjustment is shortened and adjustment of the filter module characteristics can be easily made.

Furthermore, according to the present invention, since a filter can be connected to the outside in order to measure the characteristics of the filter at the portion of the filter where the a device is later connected, the measurement of the characteristics of the filter alone can be securely performed without being affected by any other element. Therefore, desired characteristics of a filter module can be easily obtained only by the adjustment of the filter.

Furthermore, according to the present invention, since a filter is provided with a concave portion into which a device constructed on a substrate is fitted, the filter and the device are easily assembled.

Furthermore, according to the present invention, since the device is a low-noise amplifier (LNA), a low-noise amplifier the transmission loss of which is low and which is of small size can be constructed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A manufacturing method for a filter module containing a device and a filter, the method comprising:

determining required characteristics of the filter from a measured characteristic of the device and target characteristics of the filter module;

measuring characteristics of the filter apart from the device;

determining adjustment locations and adjustment amounts of the filter based on the measured characteristics of the filter apart from the device and the required characteristics of the filter;

adjusting the filter characteristics before coupling with the device so as to meet the required characteristics of the filter; and combining the filter and the device by connection thereof.

2. The manufacturing method for a filter module as claimed in claim 1, wherein the characteristics of the filter apart from the device are measured by attachment of an adapter to a pin of the filter; and wherein the combining of the filter and the device is made by connecting the pin of the filter to a transmission line provided in the device.

3. The manufacturing method for a filter module as claimed in claim 2, wherein the device is a circuit constructed on a substrate and wherein a concave portion into which the substrate is fitted is provided in the filter.

4. The manufacturing method for a filter module as claimed in claim 3, wherein the device is a low-noise amplifier and wherein the filter is connected in one of a front stage and a rear stage of the low-noise amplifier.

5. The manufacturing method for a filter module as claimed in claim 2, wherein the device is a low-noise amplifier and wherein the filter is connected in one of a front stage and a rear stage of the low-noise amplifier.

6. The manufacturing method for a filter module as claimed in claim 1, wherein the device is a circuit constructed on a substrate and wherein a concave portion into which the substrate is fitted is provided in the filter.

7. The manufacturing method for a filter module as claimed in claim 6, wherein the device is a low-noise amplifier and wherein the filter is connected in one of a front stage and a rear stage of the low-noise amplifier.

8. The manufacturing method for a filter module as claimed in claim 1, wherein the device is a low-noise amplifier and wherein the filter is connected in one of a front stage and a rear stage of the low-noise amplifier.

* * * * *